United States Patent

Matta et al.

[11] 3,878,043
[45] Apr. 15, 1975

[54] METHOD FOR PREPARING L-DOPA AND NOVELS COMPOUNDS USEFUL THEREIN

[75] Inventors: Michael S. Matta, Edwardsville; Joe A. Kelley, Collinsville, both of Ill.; Michael F. Rohde, Columbus, Ohio

[73] Assignee: Southern Illinois University Foundation, Carbondale, Ill.

[22] Filed: Jan. 2, 1973

[21] Appl. No.: 320,108

[52] U.S. Cl.............. 195/29; 195/30; 195/47; 260/240 F; 260/471
[51] Int. Cl............................................. C12d 1/00
[58] Field of Search............ 195/28, 29, 30, 47, 96

[56] References Cited
UNITED STATES PATENTS

| | | | |
|---|---|---|---|
| 3,290,225 | 12/1966 | Rauenbusch et al. | 195/29 |
| 3,344,023 | 9/1967 | Reinhold et al. | 260/471 A X |
| 3,347,752 | 10/1967 | Rauenbusch et al. | 195/29 |
| 3,641,097 | 2/1972 | Hegedus et al. | 260/240 F X |

*Primary Examiner*—Alvin E. Tanenholtz
*Assistant Examiner*—Robert J. Warden
*Attorney, Agent, or Firm*—Koenig, Senniger, Powers and Leavitt

[57] ABSTRACT

A method for producing L-dopa at high rates, high yields and relatively low cost. In accordance with the method, a resolution system is prepared comprising a mixture of optical isomers of a precursor compound and a proteolytic enzyme in an aqueous medium. The L-isomer of the precursor compound, which corresponds to the structural formula:

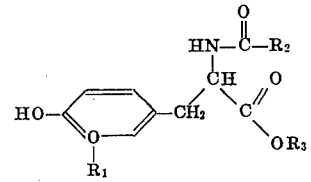

where $R_1$ is hydrogen, methyl or ethyl, $R_2$ is hydrogen, alkyl, aryl, furyl, thienyl, styryl, t-butyloxy or benzyloxy, and $R_3$ is methyl, ethyl, n-propyl and isopropyl, is hydrolyzed to produce the L-isomer of a substituted N-acyl alanine intermediate corresponding to the structural formula:

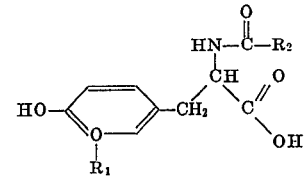

while the D-isomer of the precursor remains substantially unchanged. The N-acyl-L-alanine intermediate is isolated from the D-isomer of the precursor and then hydrolyzed to produce L-dopa.

21 Claims, No Drawings

METHOD FOR PREPARING L-DOPA AND NOVELS COMPOUNDS USEFUL THEREIN

BACKGROUND OF THE INVENTION

This invention relates to the field of pharmaceutical manufacture and more particularly to an improved method for the preparation of L-dopa.

3-(3,4-dihydroxyphenyl)-L-alanine (L-dopa) is a therapeutic drug which has been found to be uniquely effective in the treatment of Parkinson's disease. Because of the complexity, slow reaction rates, and poor yields generally associated with most of the previously known methods for preparing L-dopa, however, its cost is prohibitively high. Alleviation of the tremors caused by Parkinson's disease typically requires administration of 5–10 g./day of L-dopa. The cost to the patient of such treatment is approximately $35.00/day, i.e., $3.50 to $7.00 per gram.

The high cost of L-dopa manufacture results from the necessity for separation of optical isomers of either dopa or one of its precursors. Only the L-isomer of dopa is therapeutically useful, while the D-isomer, if administered with the L-isomer in a racemic mixture for example, causes harmful side effects. The preparation of substantially pure L-dopa has so far required the employment of awkward processing schemes which suffer severely from the above-noted complexities, slow reaction rates, and yield problems.

Three general types of processes are known for resolution of DL-dopa or one of its precursors. Most commonly used, perhaps, are chemical resolution methods in which an optically active resolving agent, usually of natural origin, is employed. Physical methods such as liquid chromatography have also been used. Finally, biological resolution methods are known in which a stereospecific chemical reaction is catalyzed with a purified enzyme or an unpurified or partially purified biological extract.

The chemical resolution methods typically involve the use of an optically active alkaloid or other amine which forms a salt with dopa or a dopa precursor. Fractional crystallization of the racemic salt mixture affords separation of the optical isomers. Acidification of the L-salt obtained from the fractional crystallization yields a pure L-dopa or a pure L-dopa precursor which may be converted to L-dopa. Typical of these methods is the resolution of N-acetyl-3-(3,4-methylenedioxyphenyl)-DL-alanine by preparation of its cinchonine salt which is fractionally crystallized and treated with acid to produce optically pure D and L N-acetyl-3-(3,4-methylenedioxyphenyl)-alanine. These isomers may be converted to D- and L-dopa. In a similar method, N-acetyl-3-(3,4-dimethoxyphenyl)-DL-alanine is separated into its D and L isomers using d-ephedrine as the resolving agent. In both instances, the resolution procedure involves the use of large amounts of the optically active resolution agent and is time consuming. Productivity, therefore, is generally low. Further difficulties arise from the fact that the amine resolving agents are usually expensive. Since they are also used in large quantities relative to the amount of material processed, even a small proportional loss of the amine has a substantial adverse effect on the overall cost of producing L-dopa.

Liquid chromatographic methods have been developed in which DL-dopa is directly resolved using an optically active packing. As is commonly the case in chromatographic methods, however, the flow rates of such processes are very low and the chromatographic methods for dopa resolution are thus not adapted for economical production processes.

Known biological methods for the preparation of L-dopa include the asymmetric hydrolysis of N-benzoyl-3-(3,4-methylenedioxyphenyl)-DL-alanine using a soil bacterial suspension and the optically selective cleavage of N-acetyl-3-(3,4-methylenedioxyphenyl)-DL-alanine using the enzyme Takadiastase. Both of these methods are very slow, however, and the biological preparations used therein are not readily available.

Among the better methods known to the art prior to the present invention is that described by J. H. Tong, C. Petitclare, A. D'Iorio, and N. L. Benoiton, *Can. J. Biochem.*, 49, 877 (1971). In this method, the ethyl ester of DL-dopa is resolved using chymotrypsin, a proteolytic enzyme. The method is relatively slow, however, and requires that DL-dopa first be synthesized, then converted to its ethyl ester and then resolved. A relatively high enzyme loading is also required and yields are not as high as desired.

SUMMARY OF THE INVENTION

It is an object of the present invention to provide an improved method for the production of L-dopa. It is a further object of the invention to provide such a method which allows production of L-dopa at relatively high rates and high yields, using readily available starting materials. Other objects and features will be in part apparent and in part pointed out hereinafter.

Briefly, therefore, the present invention is directed to a method of preparing an intermediate which is readily convertible to L-dopa. In this method, a resolution system is prepared comprising a mixture of optical isomers of a precursor compound and a proteolytic enzyme in an aqueous medium. The precursor compound corresponds to the structural formula:

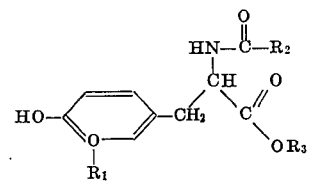

where $R_1$ is selected from the group consisting of hydrogen, methyl and ethyl, $R_2$ is selected from the group consisting of hydrogen, alkyl, aryl, furyl, thienyl, styryl, t-butyloxy and benzyloxy, and $R_3$ is selected from the group consisting of methyl, ethyl, n-propyl and isopropyl. The L-isomer of this precursor is hydrolyzed to produce the L-isomer of a substituted alanine intermediate corresponding to the structural formula:

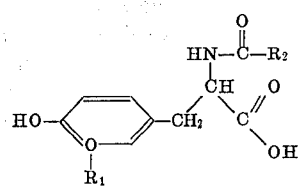

while the D-isomer of the precursor compound remains substantially unchanged. The substituted L-alanine intermediate is isolated from the unchanged D-isomer of the precursor and the isolated L-alanine intermediate may be hydrolyzed to produce L-dopa.

The invention is also directed to certain novel compounds from which the above-described precursor compound can be derived, and to methods for preparing such novel compounds.

DESCRIPTION OF THE PREFERRED EMBODIMENT

The present invention affords the opportunity for a material reduction in the cost of the commercial preparation of L-dopa. The raw materials required are readily available and the processing method is straightforward. The rates of both reaction and separation steps are high compared to previously known methods for the production of L-dopa, and yields of 90 percent or higher are obtainable in the resolution step. Relatively modest amounts of proteolytic enzyme are required by comparison to previous processes, the method of the invention being particularly advantageous in this respect by comparison to the method of Tong et al. described above.

It has now been discovered that an N-acyl-L-alanine, which is readily convertible to L-dopa, may be rapidly obtained in high yield from the stereospecific enzymatic hydrolysis of an alkyl N-acyl-DL-alaninate ester precursor corresponding to the structural formula:

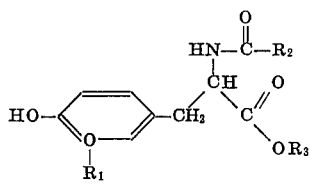

where $R_1$, $R_2$ and $R_3$ are as defined above. Typical of the wide variety of alkyl groups which may constitute $R_2$ include methyl, ethyl, n-propyl, isopropyl, n-butyl, sec-butyl, amyl, dodecyl, chlormethyl, bromopropyl, butyloxypropyl, amyloxybutyl and benzyl. Among the aryl groups which $R_2$ may be are phenyl, chlorphenyl, naphthyl, propoxyphenyl, bromonaphthyl, toluyl, and aminophenyl. Conveniently, $R_2$ is hydrogen, methyl or phenyl. In a preferred embodiment, the precursor is methyl N-acetyl 3-(4-hydroxy-3-methoxyphenyl)-DL-alaninate, i.e., $R_1$, $R_2$ and $R_3$ are each methyl.

In accordance with the method of the invention, a racemic mixture of the N-acyl-DL-alaninate ester precursor is placed in an aqueous medium and a proteolytic enzyme, preferably α-chymotrypsin, is added. The acqueous medium preferably includes a solvent compatible with water to increase the solubility of the precursor in the system. Up to about 30 percent by weight of solvent can be tolerated with about 15 percent by weight being preferred. The solvent is preferably methanol but may be another polar solvent such as, for example, isopropanol, ethanol, n-propanol, p-dioxane, dimethylformamide, or dimethylsulfoxide.

In the presence of α-chymotrypsin, the L-isomer of a precursor compound such as that described above, for example methyl N-acetyl-3-(4-hydroxy-3-methoxyphenyl)-L-alaninate, is selectively and rapidly hydrolyzed to form an N-acyl-L-alanine corresponding to the structural formula:

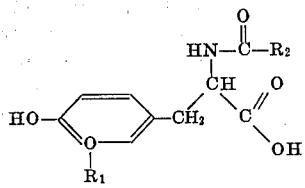

where $R_1$ and $R_2$ are as defined above, while the D-isomer of the ester remains substantially unchanged. The reaction proceeds most rapidly and completely at a pH on the order of about 8, preferably 7.8. It is thus preferable to adjust the pH of the reaction system to about 7.8, at or near the beginning of the reaction period, by means of a base. As reaction proceeds and free carboxylic acid is produced, the pH of the system will tend to drop, and if maximum reaction rates are to be maintained, additional base is added during the reaction period to maintain the pH at approximately 7.8. The base which is utilized in the reaction is preferably an alkali metal hydroxide or alkoxide such as, for example, sodium hydroxide, potassium hydroxide, lithium hydroxide, sodium ethodixe, potassium propoxide, lithium butoxide, or the like. If desired, an alkaline earth hydroxide such as calcium hydroxide, may also be used but is less preferred.

Although the use of α-chymotrypsin as the catalyst is preferred, essentially any proteolytic enzyme may be used to catalyze the hydrolysis of the N-acyl-L-alaninate ester. Among the particular alternative enzymes which can be employed are PRONASE and the various subtilisns. Proteolytic enzymes which have been immobilized by covalent bonding to an insoluble support may also be effective hydrolysis catalysts. Typical carriers include glass beads and carboxymethylcellulose as well as various resins. Supported enzymes can be used in either batch or continuous flow processing and possess the advantage of being readily removable by filtration.

Where an enzyme other than α-chymotrypsin is used, the optimum pH may differ from 7.8. Enzyme hydrolysis reactions are generally favored by pH's in the range of 5.5 to 9 and the optimum pH for a particular enzyme is generally either known to the art or determinable by simple experimentation.

Hydrolysis of the L-isomer of the precursor N-acyl alaninate ester proceeds rapidly. Under the preferred conditions, where the reaction is catalyzed by α-chymotrypsin and the pH is maintained at about 7.8 throughout the reaction period, reaction is typically complete in approximately 45 minutes. The N-acyl L-alanine hydrolysis product is then isolated from the unchanged D-isomer of the precursor alaninate ester by solvent extraction. In the extraction process, the aqueous reaction system is contacted with an organic solvent, preferably a low molecular weight solvent having a specific gravity less than that of water, and the unchanged D-isomer is taken up in the solvent. Ethyl acetate is a particularly suitable extraction solvent, but other esters, ethers, etc. may be used.

After removal of the unchanged D-isomer by extraction, the aqueous phase is concentrated to yield a residue containing the N-acyl L-alanine hydrolysis product. Before concentration, the aqueous phase is adjusted to a pH of about 3 by addition of a mineral acid such as hydrochloric acid. Concentration may be effected either by simple evaporation or by lyophilization. The residue obtained from the concentration step is then taken up in an organic solvent such as methanol, filtered for removal of solid impurities, and concentrated under vacuum to provide a purified N-acyl-L-alanine. Further purification may be accomplished by recrystallization from a mixed methanol/ether solvent.

The purified N-acyl-L-alanine may be readily converted to L-dopa by conventional acid hydrolysis techniques. The hydrolysis may, for example, be accomplished in hydrobromic acid or a mixture of hydrobromic acid and phenol. The method described in the J. Med. Chem., 1971, Vol. 14, No. 10, page 1021, for the conversion of N-acetyl-3-(3,4-methylenedioxyphenyl)-L-alanine to L-dopa is also effective for the conversion of the N-acyl-L-alanines to L-dopa.

The preferred alkyl N-acyl alanine percursor, methyl N-acetyl-3-(4-hydroxy-3-methoxyphenyl)-DL-alaninate is a known compound. Its preparation is described in Knoll A. G. Chemische Fabriken Netherlands Pat. application No. 6,613,751, Mar. 31, 1967. The present invention, however, provides an improved method for the rapid, high-yield, straightforward preparation of the alkyl N-acyl-DL-alaninate precursor. In the preferred embodiment of the invention, the starting materials for the synthesis of this precursor are a substituted benzaldehyde such as benzyloxy-3-methoxy benzylaldehyde and an N-acyl glycine such as acetyl glycine. Using these starting materials, the alaninate precursor is prepared in a three-step synthesis. Two of the intermediates obtained in this synthesis are novel compounds.

In the first step of the preferred synthesis, a novel substituted azlactone corresponding to the structural formula:

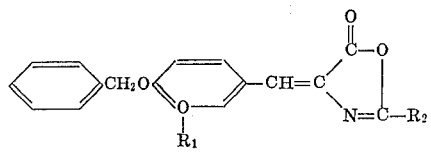

where $R_1$ and $R_2$ are as defined above, is prepared by reaction of a substituted benzaldehyde corresponding to the structural formula:

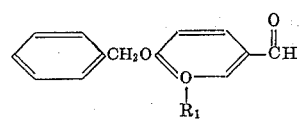

and an N-acyl glycine corresponding to the structural formula:

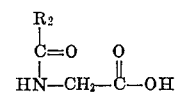

The reaction is catalyzed by an alkali metal acetate or a tertiary amine such as triethyl amine. A dehydrating agent such as acetic anhydride is also preferably present for absorption of reaction water and consequent promotion of the forward progress of the reaction. The reaction is preferably conducted at elevated temperature and is typically complete in about 2 hours if a temperature of about 70° C. is maintained. At the end of the reaction, a lower alcohol such as methanol is added and the resulting mixture is cooled, for example to 0° C., to effect precipitation of the product. The precipitate is then recovered, as by filtration, washed with a lower alcohol, and dried.

In the second step of the synthesis, a novel ring substituted α-acylamido cinnamate ester corresponding to the structural formula:

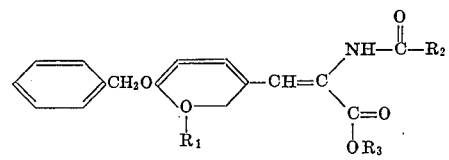

wherein $R_1$, $R_2$ and $R_3$ are as described above is prepared by reaction of the above-described azlactone with a lower alcohol corresponding to the formula $R_3OH$. Reaction is preferably effected in the presence of a base such as sodium carbonate at elevated temperature, for example at reflux temperature. Alternatively, the esterification may be acid catalyzed, for example with hydrogen chloride. Regardless of how the esterification is catalyzed, it is important to maintain an anhydrous system. Under the preferred conditions, reaction is complete in approximately 1 hour. At the end of the reaction period, the product is precipitated by cooling the reaction mixture, preferably to a temperature of about 0°C. and recovering the crystalline precipitate, as by filtration. The product is preferably recrystallized from a lower alcohol such as methanol before use in the subsequent steps of the synthesis. The alkyl N-acyl-DL-alaninate precursor is next prepared by catalytic hydrogenation of the novel α-acylamido cinnamate ester. In this step of the process, simultaneous debenzylation and reduction of the cinnamate double bond are accomplished. A palladium catalyst, preferably 5 percent Pd/C, is utilized and the hydrogenation reaction is preferably conducted in a polar solvent, for example methanol, dioxane or acetic acid. A hydrogen pressure of at least about 3 atmospheres is used. After hydrogenation is complete, the catalyst is separated, as by filtration, and the product recovered by removal of the solvent.

The following examples further illustrate the invention:

EXAMPLE 1

The azlactone 4-[-4-(benzyloxy)-3-methoxybenzylidene]-2-methyl-2-oxazolin-5-one was prepared by reaction of 4-benzyloxy-3- methoxybenzaldehyde and acetylglycine. A mixture was initially prepared containing 4-benzyloxy-3-methoxybenzaldehyde (24.2 g., 0.10 mole), acetylglycine (11.7 g., 0.10 mole), and acetic anhydride (20.6 g., 0.20 mole). This mixture was stirred and triethyl amine (10.1 g., 0.10 mole) was added. The stirred mixture was maintained at 70° C. for 2 hours, after which methanol (30 ml.) was added, and the solution obtained was cooled to 0° C. and stirred for an additional 2 hours at the latter temperature. The yellow precipitate which formed was removed by filtration, washed with methanol, and dried at reduced pressure to provide 11.0 g. (35 percent yield) of the product 4-[-4(benzyloxy)-3-methoxybenzylidene]-2-methyl-2-oxazolin-5-one which had a m.p. of 161° C. Elemental analysis confirmed that the product conformed to the formula $C_{19}H_{17}NO_4$.

EXAMPLE 2

A solution containing the azlactone produced in Example 1 (10.0 g., 31 mmoles), methanol (200 ml.), and sodium carbonate (3.0 g.) was refluxed for 1 hour. The hot solution was then filtered and cooled to 0° C. and the crystalline precipitate isolated by filtration. The precipitate was recrystallized from methanol, yielding 9.4 g. (85 percent yield) of colorless methyl α-acetamido-4-benzyloxy-3-methoxy cinnamate product having a m.p. of 167° C. Elemental analysis confirmed that the product corresponded to the formula $C_{20}H_{21}NO_5$.

EXAMPLE 3

A mixture was prepared containing the product of Example 2 (10.0 g., 28 mmoles), and 5 percent palladium on carbon catalyst (3.5 g.) in acetic acid (100 ml.). The mixture was placed under 4 atmospheres of hydrogen pressure in a closed vessel and hydrogenation conducted for one hour. The catalyst was separated by filtration and solvent removed from the filtrate to provide 7.3 g. (97 percent yield) of colorless methyl N-acetyl-3-(4-hydroxy-3-methoxyphenyl)-DL-alaninate having a m.p. of 115° C. Elemental analysis confirmed that the product had the formula $C_{13}H_{17}NO_5$.

EXAMPLE 4

A solution was prepared containing methyl N-acetyl-3-(4-hydroxy-3-methoxyphenyl)-DL-alaninate prepared in Example 3 (4.0 g., 15 mmoles) in methanol (15 ml.). Deionized water (85 ml.) was then added and the clear solution was adjusted to a pH of 7.8 by addition of 1N sodium hydroxide solution. α-chymotrypsin (Worthington lot CDI OBK, 20 mg.) dissolved in water (2 ml.) was introduced into the stirred aqueous methanol solution of the DL-alaninate. Hydrolysis proceeded in the presence of the α-chymotrypsin, and the pH was maintained at approximately 7.8 during the course of the reaction by the further addition of 1N sodium hydroxide. After 45 minutes, 7.45 ml. of the sodium hydroxide solution had been consumed (99 percent of theoretical based on exclusive hydrolysis of one isomer), and the reaction was stopped. The reaction mixture was then continuously extracted overnight with ethyl acetate, the organic layer removed, and the organic solvent evaporated at reduced pressure to provide 1.95 g. (98 percent recovery) of an oily liquid. This liquid was taken up in a mixture of chloroform and hexane and crystallized to produce 1.8 g. (90 percent recovery) of colorless unchanged methyl N-acetyl-3-(4-hydroxy-3-methoxyphenyl)-D-alaninate having a m.p. of 127°–128° C. A solution containing 5 g. of this material in 100 ml. of methanol exhibited a specific rotation at 25° C. of −23.8°. Elemental analysis confirmed that this product conformed to the formula $C_{13}H_{17}NO_5$.

The aqueous layer obtained from the extraction was adjusted to a pH of 3 by addition of hydrochloric acid, and then evaporated to dryness at reduced pressure. The residue obtained from evaporation was dissolved in warm methanol (30 ml.) and the resulting solution filtered. Solvent was removed in vacuo from the filtrate to provide 1.8 g. (90 percent yield) of N-acetyl-3-(4-hydroxy-3-methoxyphenyl)-L-alanine, a brittle colorless glass exhibiting a specific rotation (5g./100 ml. methanol) of +35.8° at 25° C. Elemental analysis confirmed that this product conformed to the formula $C_{12}H_{15}NO_5$.

To confirm its optical purity, 1.0 g. (3.96 mmoles) of the N-acyl-L-alanine product was reesterified and the ester obtained crystallized from a mixture of chloroform and hexane. 800 mg. (76 percent yield) of the ester having a m.p. of 127°–128° C. was obtained. A 5 g./100 ml. methanol solution of this ester had a specific rotation at 25° C. of +23.6°, indicating that the products of the stereospecific hydrolysis were of high optical purity. Elemental analysis of the product of the reesterification reaction confirmed that it corresponded to the formula $C_{13}H_{17}NO_5$.

Further confirmation of the completeness of the separation and of the configurational assignments was obtained by converting to D-dopa the unchanged methyl N-acetyl-3-(4-hydroxy-3-methoxyphenyl)-D-alaninate recovered from the stereospecific hydrolysis step. From 1.8 g. (617 mmoles) of the recovered D-alaninate, 1.0 g. (76 percent yield) of D-dopa having a m.p. of 278° C. was obtained using the conversion method described for L-dopa in Example 5, infra. A solution containing 5 g. of this material and 100 ml. of 1N hydrochloric acid exhibited a specific rotation at 25° C. of +13.3°.

EXAMPLE 5

N-acetyl-3-(4-hydroxy-3-methoxyphenyl)-L-alanine (1.8 g.) was prepared in the manner described in Example 4 and mixed with a 4 percent by weight hydrobromic acid solution (4 ml.) containing phenol (2 ml.). The resulting solution was evaporated to a red syrup which was then dissolved in ethyl acetate (4 ml.). The ethyl acetate solution was extracted successively with 2 ml. and 1 ml. portions of water and the resultant aqueous layers combined and adjusted to pH 5 with concentrated ammonium hydroxide containing a small proportion of sodium bisulfite. Colorless crystals formed, after which the mixture was cooled and the crystals separated by filtration, washed with water and dried at reduced pressure yielding 1.27g. of crude L-dopa. The crude L-dopa was recrystallized from water and 1.06g. of purified L-dopa (76 percent yield) was obtained. The purified product had a m.p. of 278° C. and exhibited a specific rotation (5 percent in 1N HCl) of −13.3° at 25° C.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A method of preparing an intermediate which is readily convertible to L-dopa comprising the steps of:
preparing a resolution system comprising a mixture of optical isomers of a precursor compound and a proteolytic enzyme in an aqueous medium, said precursor compound corresponding to the structural formula:

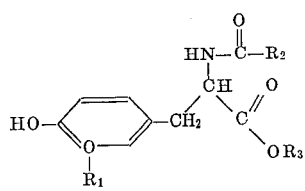

wherein $R_1$ is selected from the group consisting of hydrogen, methyl and ethyl, $R_2$ is selected from the group consisting of hydrogen, alkyl, aryl, furyl, thienyl, styryl, t-butyloxy and benzyloxy, and $R_3$ is selected from the group consisting of methyl, ethyl, n-propyl and isopropyl;
hydrolyzing the L-isomer of said precursor compound to produce the L-isomer of a substituted N-acyl alanine intermediate corresponding to the structural formula:

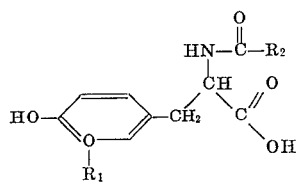

while leaving the D-isomer of said precursor compound substantially unchanged; and
isolating said intermediate from the unchanged D-isomer of the precursor.

2. A method as set forth in claim 1 wherein the pH of the medium is maintained at between about 5.5 and about 9 during the hydrolysis.

3. A method as set forth in claim 1 wherein said proteolytic enzyme is α-chymotrypsin.

4. A method as set forth in claim 3 wherein a pH on the order of about 7.8 is maintained during the hydrolysis.

5. A method as set forth in claim 4 wherein a base selected from the group consisting of alkali metal hydroxides, alkaline earth metal hydroxides and alkali metal alkoxides is present during hydrolysis.

6. A method as set forth in claim 1 wherein the enzyme is covalently bonded to an insoluble support.

7. A method as set forth in claim 1 wherein the hydrolysis is conducted in the presence of a water-miscible organic solvent.

8. A method as set forth in claim 7 wherein said solvent is selected from the group consisting of methanol, ethanol, isopropanol, n-propanol, p-dioxane, dimethyl sulfoxide and dimethyl formamide.

9. A method as set forth in claim 1 wherein $R_2$ is selected from the group consisting of hydrogen, methyl, ethyl and phenyl.

10. A method as set forth in claim 9 wherein $R_1$ is methyl, $R_2$ is methyl, and $R_3$ is methyl.

11. A method as set forth in claim 1 wherein isolation of the substituted N-acyl-L-alanine intermediate from the D-isomer of the precursor comprises the steps of:
contacting the aqueous medium with an organic solvent thereby extracting the D-isomer of the precursor from the aqueous medium;
acidifying the aqueous layer after extraction;
removing the water from the aqueous layer to produce a dry residue containing the L-alanine intermediate; and
recrystallizing the substituted L-alanine intermediate from the residue using an organic solvent.

12. A method as set forth in claim 1 wherein said mixture is initially prepared from a ring-substituted α-acylamido cinnamate ester corresponding to the structural formula:

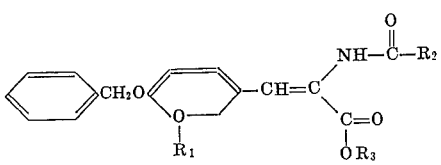

wherein $R_1$, $R_2$ and $R_3$ are as defined above, the preparation comprising catalytic hydrogenation of said α-acetamido cinnamate.

13. A method as set forth in claim 12 wherein the hydrogenation catalyst is palladium.

14. A method as set forth in claim 13 wherein the catalyst is 5 percent palladium on carbon.

15. A method as set forth in claim 12 wherein a hydrogen pressure of at least about 3 atmospheres is maintained during the hydrogenation.

16. A method as set forth in claim 12 wherein said ring-substituted α-acyl-amido cinnamate ester is prepared from an azlactone compound corresponding to the structural formula:

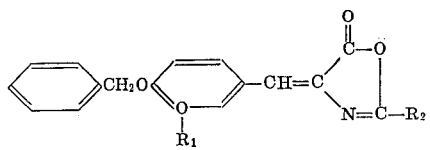

wherein $R_1$ and $R_2$ are as defined above, the preparation of said ring-substituted α-acyl-amido cinnamate ester comprising reaction of said azlactone compound with a compound corresponding to the formula $R_3$—OH where $R_3$ is as defined above, in the presence of a catalyst for the reaction.

17. A method as set forth in claim 16 wherein preparation of said azlactone compound comprises the reaction of a substituted benzaldehyde corresponding to the structural formula:

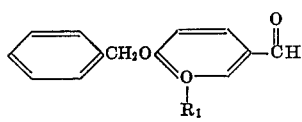

and an N-acyl glycine corresponding to the structural formula:

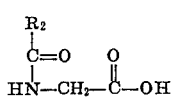

wherein $R_1$ and $R_2$ are as defined above, in the presence of a catalyst for the reaction.

18. A method as set forth in claim 17 wherein the catalyst is selected from the group consisting of alkali metal acetates and tertiary amines.

19. A method as set forth in claim 17 wherein a dehydrating agent is present during reaction between the substituted benzaldehyde and the N-acyl glycine.

20. A method as set forth in claim 1 wherein the isolated intermediate is hydrolyzed to produce L-dopa.

21. A method as set forth in claim 20 wherein said substituted N-acyl-L-alanine intermediate is hydrolyzed in an aqueous solution containing hydrobromic acid.

* * * * *